UNITED STATES PATENT OFFICE.

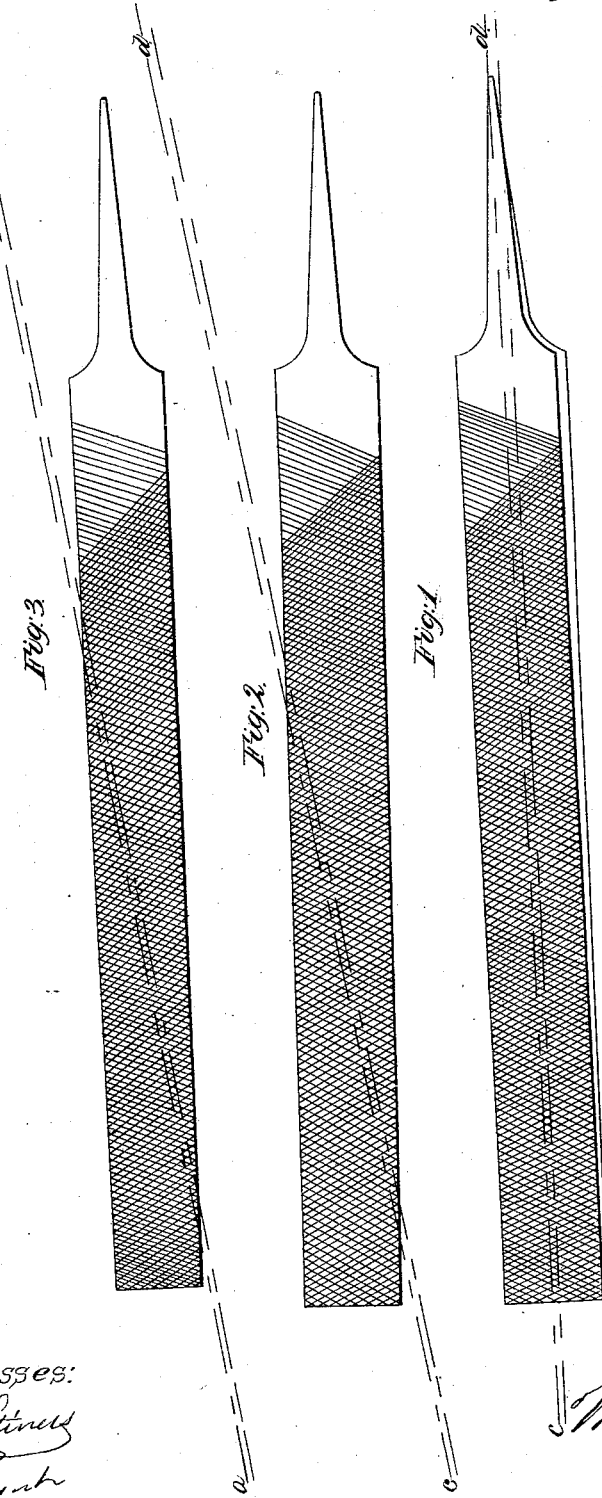

WILLIAM T. NICHOLSON, OF PROVIDENCE, RHODE ISLAND.

IMPROVED FILE FOR DRESSING METAL.

Specification forming part of Letters Patent No. 44,443, dated September 27, 1864.

*To all whom it may concern:*

Be it known that I, WILLIAM T. NICHOLSON, of the city and county of Providence, in the State of Rhode Island, have invented a new and useful Improvement in Files; and I do hereby declare that the following specification, taken in connection with the drawings making a part of the same, is a full, clear, and exact description thereof.

Figure 1 is a perspective view of my improved file. Fig. 2 is a view of the opposite face of the same. Fig. 3 is a view of one of the faces of a machine-cut file as heretofore made.

The improved file for dressing metal which is the subject of this patent is similar to those which are cut by the machine for that purpose for which Letters Patent in two parts were granted to me April 5, A. D. 1864, and it differs from all hand or machine cut files heretofore known in the principles upon which the several rows of cutting-barbs are arranged with reference to each other, so as not only to produce a smooth and uniform cut upon the work without leaving ridges and furrows, but also to prevent the common tendency of files to cut the metal away faster upon one side than upon the other. Its distinctive peculiarities will be better understood after a reference to the characteristics of both machine and hand cut files as heretofore made, resulting from the manner in which their ranges of teeth are cut. In all other files cut by machinery the lands or spaces between the several cuts from the shank to the point would be of uniform width if the faces of the blank were parallel to each other, owing to the fact that the blank is fed under the cutter at a uniform rate of speed. As, however, the majority of files have their faces more or less curved for the distance of one-third of their length or more from the point, it follows that with a uniform feed motion the width of the lands between any two rows of the teeth upon that part of the surface which is curved will be greater than the width of the lands between any two rows of teeth upon the surface which is flat, as the length of the arc of curvature is greater than the distance which the longitudinal axis of the blank travels for each cut, and consequently the teeth will be coarser near the end than at the middle of the file, which is the reverse of what is desired. In addition to this, the lines of furrows will all be parallel with each other, as shown by the red lines *a b*, Fig. 3, whereby a tendency is given to the teeth to follow in the same cuts in the work and leave a ribbed or fluted surface upon the metal when used. It is entirely due to these facts that machine-cut files have been regarded among mechanics as inferior in durability and efficiency to those cut by hand, for, as the heavier portion of the work comes upon those teeth which are nearer the middle of the file they are subjected to a greater amount of wear, and being smaller become dull and unserviceable at this part sooner than the corresponding teeth in a file of the same number and grade cut by hand. Besides, this manner of cutting the ranges of teeth gives a greater sharpness of cut to the teeth at the heel and point than at the middle, and renders it extremely difficult for even a skillful workman to file a piece of metal to a flat and true surface.

In files which are cut by hand the objections incident to a machine-file cut with a uniform rate of feed are to a great extent avoided; but files so made are imperfect from another cause, arising from the fact that there is no guide by which the successive ranges of teeth are cut, except that furnished by the hand and eye of the file-cutter. He fixes upon the angle at which the row of teeth shall stand with reference to the axis of the blank, and endeavors to make each new tooth parallel with the preceding ones; but this is practically impossible, for a slight variation will insensibly occur, which, as the work proceeds, will become magnified and apparent until a corresponding error must be made to compensate for it.

A close examination of hand-cut files will disclose the want of parallelism between all the teeth of the same range, and exhibit a wavy appearance, the consequences of which defect are in kind the same, though in degree not so great, as those which follow from the machine-cut file made with a uniform feed before referred to.

The file which is the subject of this patent possesses none of the defects which are incident to both the hand and machine cut files above described. All the teeth of each range are not only perfectly parallel with each other, but the spaces between them vary by a fixed and regular law produced by and dependent upon the eccentricity of the feeding-wheel, which controls the rate of progress of the blank under the cutter, as described in the Patent No. 42,216, granted to me on the 5th day of April, A. D. 1864, before referred to. When the file-blank has received both cuts, the surface will, as in all other files, be divided into lozenge-shaped barbs. The lines of furrows which separate these barbs converge toward each other from heel to point, if the file be cut with the teeth coarsest at the shank and finest at the point, as indicated by the lines in red $c\ d$, or will diverge from the heel toward the middle and then converge toward the point, if the file is made coarser at the middle than at the shank and heel. However the machine may have its feeding mechanism adjusted, so as to produce this varying cut, the fact will be always the same, that no single barb will follow in the track of the preceding one, but will, like the chisel of a planing-machine, take a shaving from the side of the channel cut by the preceding barb. Besides, too, the perfect parallelism of the rows of teeth and the regular increase or diminution of the spaces between them prevents any tendency in the file itself to "run" to one side of the work more than to the other.

What I claim as of my invention, and desire to secure by Letters Patent, is—

A file whose ranges of teeth are separated by lands which vary from each other in width by a fixed and regular ratio of increase or decrease, as herein set forth and described.

W. T. NICHOLSON.

Witnesses:
   J. H. STINESS,
   W. B. VINCENT.